March 7, 1933.   S. N. BUCHANAN   1,900,329
GROUND WIRE COUPLER
Filed June 25, 1927    2 Sheets-Sheet 2
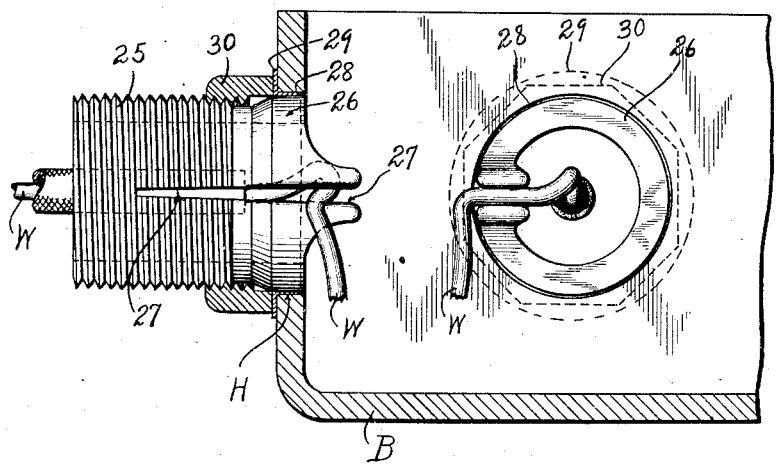
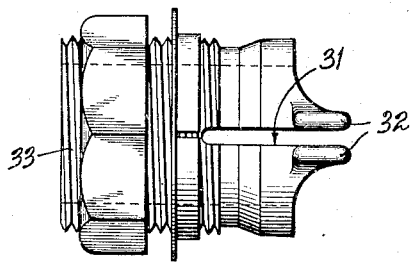 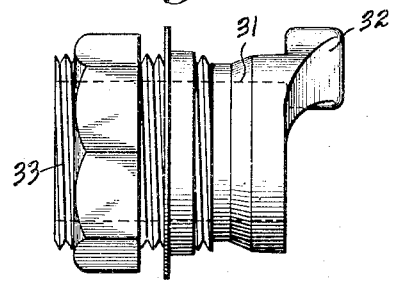
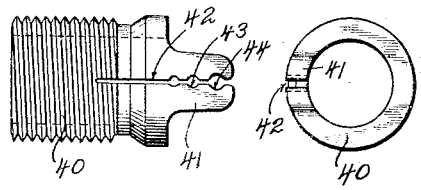  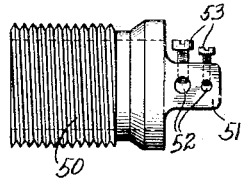 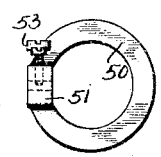
Inventor
STEPHEN N. BUCHANAN
By Attorneys
Bohleber & Ledbetter Patented Mar. 7, 1933

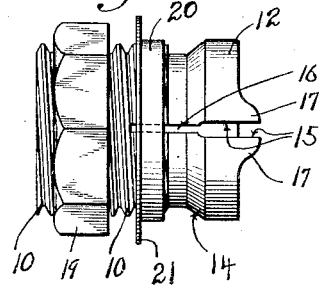
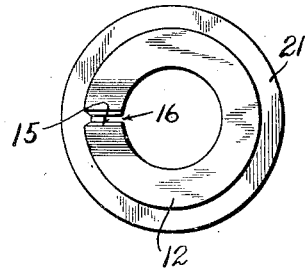
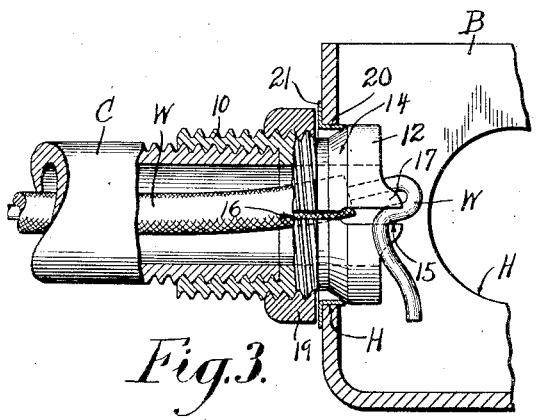
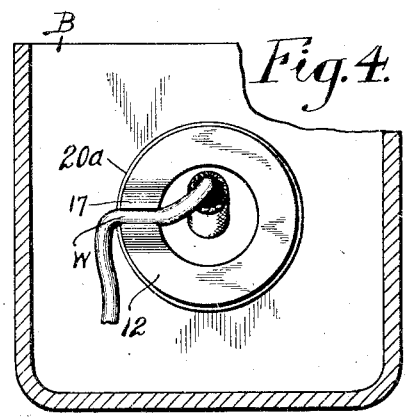
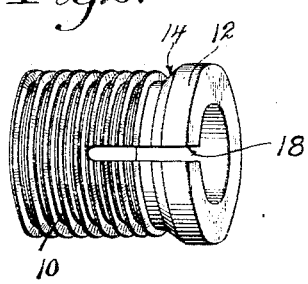
Inventor
STEPHEN N. BUCHANAN

1,900,329

UNITED STATES PATENT OFFICE

STEPHEN N. BUCHANAN, OF NEW YORK, N. Y., ASSIGNOR TO THE THOMAS & BETTS CO., OF ELIZABETH, NEW JERSEY, A CORPORATION OF NEW JERSEY

GROUND WIRE COUPLER

Application filed June 25, 1927. Serial No. 201,518.

This invention relates to anchorage devices and fittings for electric outlet boxes and the like and more particularly to a novel grounding or ground wire coupler by which a ground wire is electrically connected to an outlet box.

An object of the invention is to produce an anchorage device by which connection with a box or other structure may be effected entirely on and from the outside of the box wall, i. e. the anchorage device is installed by working entirely on the outside of the box.

Furthermore, the anchorage device or fitting includes, in one form of construction as in Sheet 1, expansion means which projects all the way thru the box wall and swedges or rivets over on the inner side of the box wall thereby establishing an anchorage that cannot be dislodged without cutting or shearing away a portion of the device. In another form as in Sheet 2, the anchorage means does not project thru the box wall but stops flush or short of being flush with the inside of the box wall surface or face, and anchorage is established with the box wall in this latter form by a powerful dilating or expanding action caused by screw operating means to force one part to move in relation to another. The principles are similar in construction.

A further object of the invention is to produce a ground wire coupler to electrically connect or ground a wire to an outlet box, and in addition thereto the coupler is used to attach a conduit or other cable protective covering to an outlet box. To fulfill these purposes, my novel conduit and wire coupler, by one and the same operating means, anchors a conduit or other cable protective covering to a box and grounds a wire to the box, the mode of installation being carried out in such a way that both the conduit and wire are simultaneously connected to the box, but should either the conduit or wire fail, by inadvertence of the workman, to be connected, then in that event the other also fails of connection which leads to prompt discovery that the installation is faulty and the same remedied.

Among other objects of the invention, it is a purpose to produce a combination conduit and ground wire coupler wherein the wire is concealed within the conduit and is lead through the coupler sleeve and its bare end turned outwardly and placed between wire gripping jaws of the pipe and wire coupler by which to render effective the box anchorage means which results in simultaneously fastening all parts to the box.

It is a further object of the invention to produce a ground wire coupler which may be installed by working entirely from outside of the box after the wire is inserted in the box, and to this end means are provided in the form of a wire receiving and gripping jaw into which the bare wire end is inserted after placing the coupler in the box hole, and operating means are provided which work on the outside of the box to simultaneously perform the double purpose of pinching the electrical ground wire in the wire jaws of the coupler member and anchoring the ground wire coupler member in the box knockout.

It is also an object to produce several forms of wire gripping jaws so shaped and designed that the wire is not damaged, cut or broken when the jaws close tightly thereon; and to this end I show several examples which illustrate the principles of my invention.

With the above and other objects in view, the accompanying drawings illustrate examples of the invention serving to show several forms thereof and to show the principle of the invention which may assume different structural forms.

Figure 1 is a side elevation of the ground wire coupler; and Figure 2 is the inner end thereof looking into the wire jaw clamping end of the fitting.

Figure 3 is a box assembly view showing a longitudinal sectional view of part of a box with the ground wire coupler inserted in the box to join a conduit and ground wire thereto, but the operating means such as a jam nut has not been tightened up and thus the parts are loosely retained in the box.

Figure 4 illustrates an inside end view of the ground wire coupler after the parts are tightened up, and this view may be considered as an inside end view of Figure 5.

Figure 5 shows the ground wire coupler placed in a box hole and the operating means tightened up to simultaneously anchor a conduit and a wire to the box.

Figure 6 is a perspective view of a ground wire coupler member with the operating nut and anchorage gland ring removed therefrom, this coupler member showing a wire jaw slot having parallel sides, differing only slightly from the jaw slot in the former views.

Figures 7 to 9 inclusive show a form of the invention wherein the ground wire anchorage device or fitting does not project thru the box wall, i. e. the fitting need not project thru the box, and this form of the fitting has certain application and uses not only in electrical fittings but in other lines as well.

Figure 7 is a box view showing a side and end view of an anchorage device in the box wall.

Figures 8 and 9 show the ground wire coupler of Figure 7 apart from the box.

Figures 10 and 11 show a top and end view, respectively, of a coupler wherein rounded wire seats in graduated sizes are made in the coupler jaw.

Figures 12 and 13 show a modified form of the coupler provided with set screws to fasten the wire.

In house and building wiring work, it is frequently necessary to anchor a conduit C or other cable protective covering to an outlet box B and at the same time it may be desirable to connect a ground wire W to the box B so as to ground the electrical wiring system to the box. The box is usually provided with a knockout opening or hole H into which a conduit coupler is inserted, and my invention provides a novel conduit and ground wire coupler to connect a pipe or conduit and a wire to the box.

In general, the combination ground wire and conduit coupler comprises a coupler member, say of sleeve form, provided with wire clamping jaws included within an enlarged and tapered, conic, inclined plane, or wedging head, together with box hole anchorage means such as a ring freely carried on the coupler member which ring is expanded in a box hole by movement of the head, and also includes operating means such as a nut to move or draw the conic head into the anchorage ring thereby simultaneously closing the wire jaws and expanding the anchorage ring by one and the same operating means.

To the above ends, a coupler member is provided with means to connect it with a conduit, and for this purpose a sleeve or body 10 may be internally screw-threaded on one end to receive and connect with said conduit C. The screw threads are merely illustrative of any means carried by the coupler member 10 by which electrical parts, such as the conduit C, may be secured to the box at a box hole opening H. The coupler sleeve is externally threaded to carry an operating or jam nut. The other end of the coupler member 10 includes at least two anchorage means, one to anchor the sleeve coupler in a box hole, the other to fasten a ground wire W to said coupler. A conic head 12—14 is formed on the sleeve, the annular conic or wedging inclined surface 14 serving to join the enlarged end 12 to the sleeve 10. The sleeve head 12 is formed by making the end wall of the member thicker or of increased size and by tapering it at 14.

Within the head 12 of the coupler member there is formed wire gripping jaws 15 included within a split 16 which may preferably extend longitudinally of the sleeve from the headed end 12—14 back into the threaded sleeve portion so as to provide the wire receiving jaws 15. The jaws close on a bare wire end by reducing the diameter of the head 12 by contraction thereof. The longitudinal opening or split which defines the jaws 15 may be reduced in width to form the split 16 as observed in Figures 1 to 5, or the split defining the wire receiving jaws may be uniformly extended as at 18 in Figure 6 thereby forming the latter split of uniform width defining the wire jaw 18 having parallel surfaces of uniform width throughout. Furthermore the slit may be generally V-shaped as seen in Figure 7 to produce a wire jaw 27 so as to accommodate any size wire within the limits of the jaw.

Each wire jaw 15 may be pointed if desired as at 17 to provide wire receiving jaws 15—17 which overhang or extend beyond the outer edge of the sleeve head 12. The head portion 12 is designed to be contracted thereby squeezing the jaws 15—17 together on the wire as will be explained. The jaw points or protuberances 17 form a wire grip of extended length while the jaw 18 in Figure 6 is made in a sleeve which has a smooth end. Either form may be used and the jaws of each are effectively closed by the operating means to be explained.

Operating means is provided to contract the wire jaws and to render effective the box anchorage means. For this purpose a nut 19 is threaded on the sleeve 10 and a cylindrical anchorage ring 20 including at one end a flange 21 is carried movably free on sleeve 10, the ring 20 being directed towards the conic or wedging surface 14 of the head 12 while the flange 21 is disposed adjacent the nut 19. The ring 20 is of soft metal so that its outer edge 20a is readily up-set and outwardly flanged as the annular wedging surface 14 of the head enters the ring.

In assembling a coupler 10, conduit C, wire W, and box B as shown in the several assembly views, the conduit C may be screw-fastened in any suitable manner to the sleeve 10, or a reducing pipe coupling may be used. The head 12 is introduced through the box hole H whereupon the bare end of the electric ground wire W is bent up through the wire jaws 15 and carried to any other required point of connection. The nut 19 is now run up against the flange 21 whereupon the head 12 begins to draw back through the box hole H in a direction reverse to that at which it was inserted. The nut 19 securely holds the flange 21 against the outer surface of the box thereby forcibly retaining the box hole anchorage ring 20 within the box hole, the result of which is to cause the conic wedging head surface 14 to up-set and flange outwardly the outer edge of the anchorage ring as indicated at 20a. This operation results in securely anchoring the sleeve 10 in the box hole because the ring 20 intercepts the head 12 and arrests its further movement so that the head is securely wedged in the box hole by expansion of the anchorage ring 20.

As the conic head surface 14 presses and wedges into the ring 20, the sleeve head 12 begins to contract in an effort to reduce its diameter thereby squeezing together the wire jaws 15 against the bare wire end thus securely anchoring the ground wire to the coupler sleeve. Since the wire end within the jaws prevents further contraction of the head than is necessary to tightly pinch the wire, it follows that the head will not contract or reduce in size thereby causing the head to swell the anchorage ring 20 within the box hole.

A positive electrical connection results in the use of this ground wire coupler inasmuch as the pressure and frictionally rubbing action of the conic head surface 14 against the anchorage ring 20 affords an effective electrical contact as between the box B and coupler 10; and also a good electric connection is established between the wire and the coupler by reason of the great pressure to which the bare wire end is subjected at the time the jam nut 19 is run hard up against the flange 21 and box.

A noteworthy feature of this novel coupler resides in the simultaneous anchorage of the wire and coupler member to the box. It is observed that should by oversight the workman on the job overlook the insertion of the bare wire end into the coupler jaws 15, that the jaws would tend to collapse as the nut 19 is screwed up thereby not only failing to connect the wire to the sleeve 10, but failing as well to connect the coupler 10 to the box since the wire must be inserted to resist closing of the jaws to maintain a rigid head 12—14 by which to swell the ring 20 in the box hole. If for any reason the wire is not placed between the jaws, the resistance of the head 12—14 is not sufficient to positively spread the anchorage ring 20 as at 20a, and the head 12 will so reduce in size as to permit it to draw back through the box hole 20 when the nut 19 is tightened up thereby leaving the pipe C loosely connected to the box. This faulty connection is readily discovered, since by shaking the pipe its looseness is detected. In this way, carelessness in installation can be readily detected inasmuch as the pipe and wire must be anchored to the box at one and the same operation, else neither one or the other thereof is properly installed. This feature makes for safety and speed in accomplishing the work.

Referring to Figure 7, a threaded coupler sleeve 25 has a conic head 26 on one end and a long tapering slit 27 formed thru the head and extending toward the other end. The conic head 26 forms a cylindrical wedge which creeps frictionally against a metal ring 28 backed up by a flange 29, if need be, the creeping motion being caused by jam nut 30 carried on the threaded sleeve 25.

Neither the ring 28 or the coupler head 26 need necessarily be made long enough to project into the box wall for it is found that positive retention of the coupler head is effected by the powerful dilating frictional action of the head 26 acting on the soft metal ring 28, the latter in effect actually uniting with the surface defining the hole edge or rim H in the structure B by reason of the expanding pressure exerted by the wedging head 26 as it creeps relatively to and within the ring 28.

It is clear enough that the flange 29, which may be integral with the anchorage gland ring 28, acts to positively hold said ring 28 in stationary position in the box hole H while the head 26 wedges into the ring, and thus the ring 28 flows so to speak into the grain or interstices of the hole surface which effects a union between the box B and metal ring 28.

The V-shaped jaw slot 27 receives a wire W of any suitable size. The slot varying in size from one end to the other, admits a small or large wire. The wire is inserted thru the coupler sleeve 25, is then bent up thru the jaws, and then drawn back until it wedges in the slot. The nut 30 is now run up and the jaw closing action is arrested by the wire W whereupon both the wire and the coupler are anchored in the box. The coupler 25 and anchorage ring 28 are anchored to the structure B by friction.

Referring to Figures 8 to 10, the slot 31 may have formed therewith wide or broad surface jaws 32 curved or rounded at their outer edges on the end of a coupler sleeve 33 by which to avoid cutting or breaking the wire. In other words a large or wide bearing surface is provided in the wire receiving jaws 32 which is found an advantage in some forms of the invention. If the jaw end 32 is made relatively large on the coupler, the device may be inserted thru the box hole from the inside of the box by removing the nut and anchorage ring.

The installation of the wire, conduit and coupler is easily accomplished, since the bare wire end may first be inserted in the box and the coupler is then inserted through the box hole, the wire placed within the jaws, and the operating nut tightened up to accomplish the two functions described, namely anchoring a wire and a conduit to the box.

In Figures 10 and 11, a coupler sleeve 40 is shown with wire clamping jaws 41 defined by a slot 42 in which rounded seats 43 and 44 are shown in graduated sizes. This construction provides a positive seat for the wires and more jaw bearing surface thereon.

In Figures 12 and 13, a coupler sleeve 50 is made with a nose 51 which extends into the box. Graduated wire receiving holes 52 are made in the nose and a set screw 53 is threaded into the nose to grip a wire received into either or both wire holes.

In the forms of construction shown in Figures 10 thru 13, any suitable means may be used to anchor the coupler in a box. For example the sleeves 40 and 50 may be tapered and provided with an anchorage ring and jam nut as described for other forms.

What I claim is:

1. In combination with an outlet box provided with an outlet hole, a coupler sleeve disposed in the hole, means upon the sleeve to which a cable protective covering is connected, box hole anchorage means carried with the coupler sleeve, ground wire receiving jaws carried with the coupler sleeve, and a single operating means carried on the sleeve to clamp the box wall between the operating means and the box hole anchorage means and to simultaneously pinch the jaws together.

2. Ground wire and conduit coupling means comprising in combination with a box provided with an outlet hole; a coupler sleeve including, a tapered conic-shaped head, and wire receiving jaw at one end, and means at the other end to connect with a conduit; a wire passed through the sleeve and having its bare end inserted into the jaw, box hole anchorage means operated by the conic head to secure the coupler sleeve in the box hole, and operating means to draw the conic head into engagement with the anchorage means to render effective the latter and to simultaneously close the jaw tight on the wire thereby anchoring all parts together.

3. A combination conduit and ground wire coupler comprising, a coupler member insertable in a box hole, wire receiving jaws carried with the coupler member and movable transversely of the member to grip a wire therebetween, operating means to move the wire receiving jaws transversely, and anchorage means cooperating with the operating means to anchor the coupler member in a box hole.

4. A combination conduit and ground wire coupler comprising, a member adapted to be inserted in a box hole, means to secure a cable protective covering to said member, wire receiving jaws carried with the member, operating means to tighten the jaws, and means rendered effective by said operating means to anchor the member and wire in a box hole.

5. A combination conduit and ground wire coupler comprising, a sleeve adapted to be inserted in a box hole, wire receiving means carried with the sleeve comprising jaws defined by a lengthwise split formed in the sleeve, operating means to tighten the wire receiving jaws by contraction of the split sleeve, and means rendered effective by said operating means to anchor the member and wire in a box hole.

6. A combination conduit and ground wire coupler comprising, a member adapted to be inserted in a box hole including a threaded end to connect with a conduit and a split formed in the other end to receive a wire, operating means to squeeze the split portion on a wire, and means rendered effective by said operating means to anchor the member and wire in a box hole.

7. A grounding coupler comprising, a member adapted to be received into a box hole and threaded at one end to connect with a conduit, a split formed at the other end of the member and extending back into the threads forming a wire gripping jaw, a nut carried on the threaded end, and means cooperating with the nut to tighten the jaws on a wire.

8. A grounding coupler comprising, a sleeve threaded from one end thereof, a wire gripping jaw formed in the other end thereof, a tapered head made on the member at the jaw end, and means including a nut carried on the threaded end and cooperating with the tapered end to compress the jaw on a wire.

9. A grounding coupler comprising, a sleeve threaded at one end and a conic head at the other end, wire gripping jaws made in the conic head, a box hole anchorage ring carried on the sleeve and expanded in a box hole by the conic head to anchor the sleeve in a box and to compress the jaws on a wire, and operating means carried on the threaded end to draw the conic head into the ring.

10. A grounding coupler comprising, a sleeve, a head formed on one end including an annular portion somewhat thicker than the sleeve and a tapered annular surface sloping from the head down to the sleeve, a slit cut through the head and tapered surface to form a wire gripping jaw, and operating and box hole anchorage means cooperating with the tapered portion to simultaneously close the jaws on a wire and anchor the sleeve in a box hole.

11. A grounding coupler comprising, a sleeve, a head formed on one end including an annular portion somewhat thicker than the sleeve and a tapered annular surface sloping from the head down to the sleeve, a slit cut through the head and tapered surface to form a wire gripping jaw, an anchorage ring carried on the sleeve adapted to be expanded in a box hole, and screw-threaded operating means to draw the tapered annular head surface into the ring to anchor the sleeve in a box hole and compress the jaws on a wire.

12. A grounding coupler comprising, a sleeve provided with a wire receiving slit at one end, jaw points extending from the slit and providing a wire gripping jaw overhanging the end edge of the sleeve; and means to anchor the sleeve in a box hole and to compress the jaws on a wire.

13. A grounding coupler comprising, a sleeve provided with a wire receiving slit at one end, jaw points extending from the slit and providing a wire gripping jaw overhanging the end edge of the sleeve, a wedging surface formed on the sleeve proximate the jaws, a box hole anchorage ring on the sleeve, and operating means to force the sleeve axially within the ring to expand the latter in a box hole and thereby anchor the sleeve in said box and also squeeze the jaws on a wire.

14. A ground wire box coupler comprising, a sleeve provided with a broad split cut from one end to provide a wire receiving jaw, said split decreased in width and extending from the jaw back through the sleeve to weaken the sleeve and facilitate contraction of the jaw, and means to anchor the sleeve in a box hole and contract the jaw on a wire.

15. A box assembly comprising in combination a box having an outlet hole, a coupler member including wire receiving means carried thereby, the coupler member exclusive of the wire receiving means extending within the outlet opening only as far as the inner face of the box wall, anchorage means upon the coupler member including a wedging means cooperating with the coupler member, and operating means forcing the coupler member longitudinally with respect to the anchorage means to frictionally engage the edge of the box hole and simultaneously actuate the wire receiving means.

16. A conduit and wire coupler comprising a member adapted to fit into a box hole including a conic head portion which is short and does not project beyond the inner face of the box wall, an anchorage ring carried on the member and also short in length so as not to project beyond the inner face of the box wall, operating means to draw the head into the ring expanding the latter in the box hole and anchoring it therein by friction, and a wire jaw formed in the member and closed on a wire by the operating means.

17. A ground wire coupler comprising, a coupler member, said member being provided with a longitudinal slit extending from one ending, said slit forming wire-clamp jaws and being made with a rounded wire seat therein to receive a wire, and means to anchor the member in a box hole and press the jaws on a wire.

18. Ground wire and coupling means comprising a coupler member, means carried by the member to secure an electrical part thereto, contractile wire gripping means carried by the member, anchorage means upon the coupler member, and operating means cooperating with the anchorage means to secure the coupler member in a box hole and to contract the wire gripping means to grip a wire thereby.

19. Ground wire and coupling means comprising a coupler member, means carried by the member to secure a cable protective covering thereto, contractile wire gripping means carried by the member, anchorage means upon the coupler member, and operating means to cause relative movement between the coupler member and the box wall to anchor the wall between the anchorage means and the operating means and to contract the wire gripping means.

20. Ground wire and coupling means comprising a coupler member, means carried by the member to secure a cable protective covering thereto, contractile wire gripping means carried by the member, means to contract the wire gripping means upon relative longitudinal movement of the coupler member with respect to the box wall, anchorage means upon the coupler member, and operating means to clamp the box wall between the anchorage means and the operating means and to move the coupler member relatively to the box wall to contract the wire gripping means.

In testimony whereof I affix my signature.

STEPHEN N. BUCHANAN.